United States Patent
He et al.

(10) Patent No.: US 9,520,792 B2
(45) Date of Patent: Dec. 13, 2016

(54) STAGGERED PARALLEL THREE-LEVEL DC/DC CONVERTER AND AC/DC CONVERTER

(71) Applicant: Huawei Technologies Co., Ltd., Shenzhen, Guangdong (CN)

(72) Inventors: Bo He, Shenzhen (CN); Yihang Lv, Shenzhen (CN); Weiping Jie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 14/141,811

(22) Filed: Dec. 27, 2013

(65) Prior Publication Data

US 2014/0111016 A1    Apr. 24, 2014

Related U.S. Application Data

(63) Continuation of application No. PCT/CN2013/070346, filed on Jan. 11, 2013.

(30) Foreign Application Priority Data

Jan. 20, 2012   (CN) .......................... 2012 1 0019090

(51) Int. Cl.
  *H02M 3/335*   (2006.01)
  *H02M 3/28*    (2006.01)
  (Continued)

(52) U.S. Cl.
  CPC ................ *H02M 3/335* (2013.01); *H02J 1/00* (2013.01); *H02M 3/285* (2013.01);
  (Continued)

(58) Field of Classification Search
  CPC .. H02M 3/285; H02M 3/335; H02M 3/33569; H02M 7/487; H02J 1/00; Y02B 70/1433; Y10T 307/707
  See application file for complete search history.

(56) References Cited

U.S. PATENT DOCUMENTS 6,970,366 B2   11/2005   Apeland et al.
7,596,007 B2    9/2009   Phadke et al.
(Continued)

FOREIGN PATENT DOCUMENTS

CN   1396697 A   2/2003
CN   1523746 A   8/2004
(Continued)

OTHER PUBLICATIONS

Ghodke et al., May 2008, IEEE, Trans. on Power Electronics, vol. 3, No. 23, 1214-1227.*

*Primary Examiner* — Jue Zhang
(74) *Attorney, Agent, or Firm* — Leydig, Voit & Mayer, Ltd.

(57) ABSTRACT

A staggered parallel three-level DC/DC converter and an AC/DC converter includes: at least one input power supply, N-phase three-level DC/DC circuits, N resonant inductors, N resonant capacitors, N transformers, N rectifier circuits, a first inductor, and an output circuit; one end of an i th resonant inductor is connected to an i th-phase three-level DC/DC circuit, the other end of the i th resonant inductor is connected to an excitation inductor of an i th transformer; one end of an i th resonant capacitor is connected to the i th-phase three-level DC/DC circuit, and the other end of the i th resonant capacitor is connected to the excitation inductor of the i th transformer; or one end of the first inductor is connected to the input power supply, and the other end of the first inductor is connected to the N-phase three-level DC/DC circuit; where N is an integer and is greater than or equal to 2, and i is an integer and $1 \leq i \leq N$.

14 Claims, 11 Drawing Sheets

(51) Int. Cl.
*H02M 7/487* (2007.01)
*H02J 1/00* (2006.01)

(52) U.S. Cl.
CPC ....... *H02M 3/33569* (2013.01); *H02M 7/487* (2013.01); *Y02B 70/1433* (2013.01); *Y10T 307/707* (2015.04)

(56) References Cited

U.S. PATENT DOCUMENTS

| | | | |
|---|---|---|---|
| 2005/0017699 A1* | 1/2005 | Stanley | G05F 1/70 323/282 |
| 2007/0086224 A1* | 4/2007 | Phadke | H02M 3/285 363/65 |
| 2010/0014321 A1 | 1/2010 | Won et al. | |
| 2010/0296319 A1 | 11/2010 | Liu | |
| 2013/0003431 A1* | 1/2013 | Reddy | 363/126 |

FOREIGN PATENT DOCUMENTS

| | | |
|---|---|---|
| CN | 101075784 A | 11/2007 |
| CN | 101345490 A | 1/2009 |
| CN | 101399499 A | 4/2009 |
| CN | 202094804 U | 12/2011 |
| CN | 102545638 A | 7/2012 |
| JP | 2001078449 A | 3/2001 |

* cited by examiner

STAGGERED PARALLEL THREE-LEVEL DC/DC CONVERTER AND AC/DC CONVERTER

CROSS-REFERENCE TO RELATED APPLICATIONS

This application is a continuation of International Patent Application No. PCT/CN2013/070346, filed on Jan. 11, 2013, which claims priority to Chinese Patent Application No. 201210019090.X, filed on Jan. 20, 2012, both of which are hereby incorporated by reference in their entireties.

TECHNICAL FIELD

The present application relates to the field of electronic technology, and in particular, to a staggered parallel three-level DC/DC converter and an AC/DC converter.

BACKGROUND

A power supply is a key part of system power conversion and commonly adopts a distributed power supply structure. A power supply is categorized, by function, into an alternating current/direct current (Alternating Current/Direct Current, AC/DC) converter and a direct current/direct current (Direct Current/Direct Current, DC/DC) converter, where the AC/DC converter is also called a primary power supply AC/DC. The alternating current input voltage of the primary power supply AC/DC commonly comes from an alternating current power grid and the alternating current input voltage (V) can be converted into −48V, +24V, +12V, and other low-voltage direct current voltages, which provides high-quality direct current power supply to a next-level load.

In addition, a primary power supply AC/DC commonly adopts a two-stage power conversion structure, in which the first stage is a power factor correction (Power Factor Correction, PFC) circuit and the next-level stage is an alienated DC/DC converter. Design for the next-level DC/DC converter is very pivotal and directly affects the efficiency, power density, reliability, and cost of an entire system. The next-level DC/DC converter includes the following types: a flyback (Flyback) converter, a forward (Forward) converter, a 2-FETs forward (2-FETs Forward) converter, a zero voltage switch (Zero Voltage Switch, ZVS) phase-shifted full-bridge (ZVS Phase-Shifted Full-Bridge) converter, a logical link control (Logical Link Control, LLC) resonant converter (LLC Resonant Converter), and a three-level converter (Three-Level Converter). Currently, to improve electrical performance of a primary power supply AC/DC, in the prior art, a next-level DC/DC converter of a primary power supply AC/DC converter widely applies a staggered parallel technology, for example: a next-level DC/DC converter includes a staggered parallel 2-FETs forward converter or a staggered parallel LLC resonant converter.

However, when a power switch of a next-level DC/DC converter adopting the staggered parallel technology in the prior art is turned off, a zero current switch (Zero Current Switch, ZCS) function cannot be implemented, resulting in a certain turn-off loss. In addition, in the next-level DC/DC converter, vibration slot parameters, such as a resonant inductor, a resonant capacitor, and an excitation inductor of a transformer, cannot be completely consistent, so it is difficult to implement current equalization between converters in the next-level DC/DC converter, causing partial overheat and affecting reliability of the next-level DC/DC converter.

SUMMARY

Embodiments of the present application provide a staggered parallel three-level DC/DC converter and an AC/DC converter, to improve the working reliability of a DC/DC converter.

A first aspect of the present application provides a staggered parallel three-level DC/DC converter, which includes: at least one input power supply, N-phase three-level DC/DC circuits, N resonant inductors, N resonant capacitors, N transformers, N rectifier circuits, a first inductor, and an output circuit;

one end of an i th resonant inductor is connected to an i th-phase three-level DC/DC circuit, and the other end of the i th resonant inductor is connected to an excitation inductor of an i th transformer; one end of an i th resonant capacitor is connected to the i th-phase three-level DC/DC circuit, and the other end of the i th resonant capacitor is connected to the excitation inductor of the i th transformer;

one end of the first inductor is connected to the output circuit, the other end of the first inductor is connected to the N rectifier circuits; or one end of the first inductor is connected to the input power supply, and the other end of the first inductor is connected to the N-phase three-level DC/DC circuits;

where N is an integer and is greater than or equal to 2, and i is an integer and $1 \le i \le N$.

Another aspect of the present application provides an AC/DC converter, which includes a power factor correction circuit and further the foregoing staggered parallel three-level DC/DC converter.

The technical effect of the present application is: after one end of an i th resonant inductor is connected to an i th-phase three-level DC/DC circuit, and the other end of the i th resonant inductor is connected to an excitation inductor of an i th transformer; one end of an th resonant capacitor is connected to the i th-phase three-level DC/DC circuit, and the other end of the i th resonant capacitor is connected to the excitation inductor of the i th transformer, so that the ZVS and ZCS of a power switch can work in the i th-phase three-level DC/DC circuit. In addition, because one end of a first inductor is connected to an output circuit, and the other end of the first inductor is connected to N rectifier circuits; or one end of the first inductor is connected to an input power supply, and the other end of the first inductor is connected to N-phase three-level DC/DC circuits; in this way, a ripple of an output filtering capacitor or a ripple of an input filtering capacitor can be reduced, thereby achieving current equalization for each-phase staggered parallel three-level DC/DC converter and further improving working reliability of a DC/DC converter.

DESCRIPTION OF EMBODIMENTS

Figure 1:
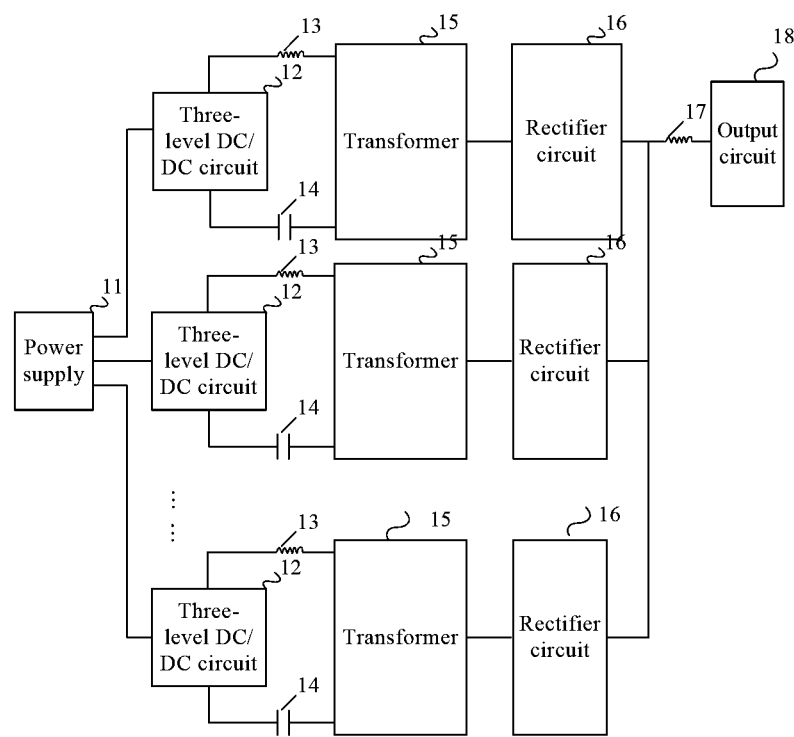
FIG. 1 is a structural schematic diagram of a staggered parallel three-level DC/DC converter according to an embodiment of the present application.

FIG. 1 is a structural schematic diagram of a staggered parallel three-level DC/DC converter according to an embodiment of the present application. As shown in FIG. 1, the staggered parallel three-level DC/DC converter includes: at least one input power supply 11, N-phase three-level DC/DC circuits 12, N resonant inductors 13, N resonant capacitors 14, N transformers 15, N rectifier circuits 16, a first inductor 17, and an output circuit 18. One end of an i th resonant inductor 13 is connected to an i th-phase three-level DC/DC circuit 12, and the other end of the i th resonant inductor 13 is connected to an excitation inductor of an i th transformer 15. One end of an i th resonant capacitor 14 is connected to the i th-phase three-level DC/DC circuit 12, and the other end of the i th resonant capacitor 14 is connected to the excitation inductor of the i th transformer 15. One end of the first inductor 17 is connected to the output circuit 18, the other end of the first inductor 17 is connected to the N rectifier circuits 16; or one end of the first inductor 17 is connected to the input power supply 11, and the other end of the first inductor 17 is connected to the N-phase three-level DC/DC circuits 12.

The i th resonant inductor 13, the i th resonant capacitor 14, and the excitation inductor of the i th transformer 15 form an i th LLC resonant network; N is an integer and is greater than or equal to 2, and i is an integer and $1 \leq i \leq N$.

In one embodiment, one end of the first inductor 17 is connected to the output circuit 18 and the other end of the first inductor 17 is connected to N rectifier circuits 16.

In one embodiment, after one end of an i th resonant inductor is connected to an i th-phase three-level DC/DC circuit, and the other end of the i th resonant inductor is connected to an excitation inductor of an i th transformer; one end of an i th resonant capacitor is connected to the i th-phase three-level DC/DC circuit, and the other end of the i th resonant capacitor is connected to the excitation inductor of the i th transformer, so that the ZVS and ZCS of a power switch can work in the i th-phase three-level DC/DC circuit. In addition, because one end of a first inductor is connected to an output circuit and the other end of the first inductor is connected to N rectifier circuits; or one end of the first inductor is connected to an input power supply, and the other end of the first inductor is connected to N-phase three-level DC/DC circuits; in this way, a ripple of an output filtering capacitor or a ripple of an input filtering capacitor may be reduced, thereby achieving current equalization for each-phase staggered parallel three-level DC/DC converter and further improving work reliability of a DC/DC converter.

Figure 2:
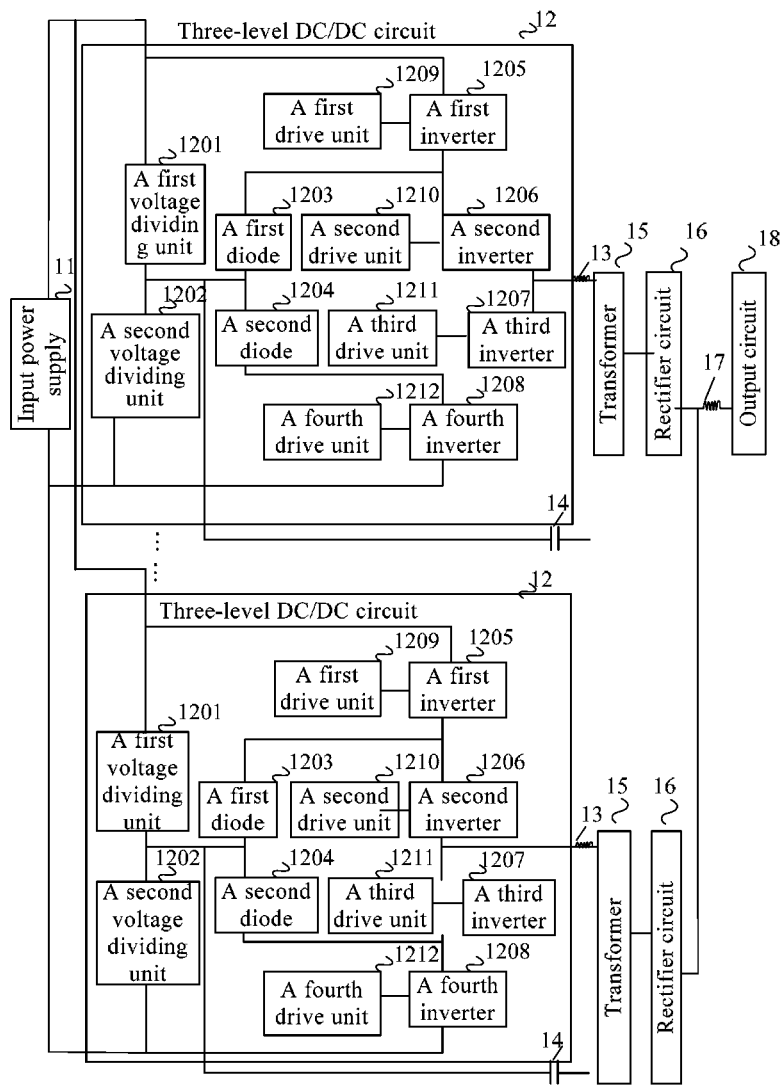
FIG. 2 is a structural schematic diagram of a staggered parallel three-level DC/DC converter according to another embodiment of the present application.

FIG. 2 is a structural schematic diagram of a staggered parallel three-level DC/DC converter according to another embodiment of the present application. Based on the foregoing embodiment, as shown in FIG. 2, an i th-phase three-level DC/DC circuit 12 includes: a first voltage dividing unit 1201, a second voltage dividing unit 1202, a first diode 1203, a second diode 1204, a first inverter 1205, a second inverter 1206, a third inverter 1207, and a fourth inverter 1208.

The first voltage dividing unit 1201 and the second voltage dividing unit 1202 are connected in series; the first diode 1203 and the second diode 1204 are connected in series. The first inverter 1205, the second inverter 1206, the third inverter 1207, and the fourth inverter 1208 are in series connected in sequence, where the positive end of the first inverter 1205 is connected to one end of the first voltage dividing unit 1201, and the negative end of the first inverter 1205 is connected to the cathode of the first diode 1203; the positive end of the second inverter 1206 is connected to the cathode of the first diode 1203, and the negative end of the second inverter 1206 is connected to one end of an i th resonant inductor 13; the positive end of the third inverter 1207 is connected to one end of an i th resonant inductor, and the negative end of the third inverter 1207 is connected to the anode of the second diode 1204; the positive end of the fourth inverter 1208 is connected to the anode of the second diode 1204, and the negative end of the fourth inverter 1208 is connected to one end of the second voltage dividing unit 1202.

Then, one end of the i th resonant inductor 13 is connected to an i th-phase three-level DC/DC circuit 12, and the other end of the i th resonant inductor 13 is connected to an excitation inductor of an i th transformer 15; one end of an i th resonant capacitor 14 is connected to the i th-phase three-level DC/DC circuit 12, and the other end of the i th resonant capacitor 14 is connected to the excitation inductor of the i th transformer 15. A specific implementation manner is:

the other end of the i th resonant inductor 13 is connected to one end of the excitation inductor of the i th transformer 15;

one end of the i th resonant capacitor 14 is connected to the other end of the excitation inductor of the i th transformer 15, and the other end of the i th resonant capacitor 14 is connected to the anode of the first diode 1203, the cathode of the second diode 1204, the other end of the first voltage dividing unit 1201, and the other end of the second voltage dividing unit 1202.

Further, each of the first inverter 1205, the second inverter 1206, the third inverter 1207, and the fourth inverter 1208 includes a power switch, a body diode, and a junction capacitor. The power switch, the body diode, and the junction capacitor are connected in parallel.

The power switch may be a metal-oxide-semiconductor field-effect transistor (Metal-Oxide-Semiconductor Field-Effect Transistor, MOSFET), an insulated gate bipolar transistor (Insulated Gate Bipolar Transistor, IGBT), or another power switch apparatus.

Further, the i th-phase three-level DC/DC circuit 12 includes: a first drive unit 1209, a second drive unit 1210, a third drive unit 1211, and a fourth drive unit 1212. The first drive unit 1209 is connected to the first inverter 1205, for outputting a first drive signal to the first inverter 1205; the second drive unit 1210 is connected to the second inverter 1206, for outputting a second drive signal to the second inverter 1206; the third drive unit 1211 is connected to the third inverter 1207, for outputting a third drive signal to the third inverter 1207; the fourth drive unit 1212 is connected to the fourth inverter 1208, for outputting a fourth drive signal to the fourth inverter 1208.

The first drive signal and the second drive signal are complementary; the third drive signal and the fourth drive signal are complementary; time for turning off a power switch in the first drive signal is earlier than time for turning off a power switch in the second drive signal, indicating that the power switch of the first inverter is turned off earlier than the power switch of the second inverter; time for turning off a power switch in the fourth drive signal is earlier than time for turning off a power switch in the third drive signal, indicating that the power switch of the fourth inverter is turned off earlier than the power switch of the third inverter.

In addition, drive signals of each-phase of three-level DC/DC circuits 12 should be staggered by M degrees from each other, where M=360/2N.

Further, the rectifier circuit 16 may be a central tap full-wave rectifier circuit, a bridge rectifier circuit, or another rectifier circuit. The rectifier circuit may be formed by a rectifier diode and a power switch.

In the embodiment, after an i th resonant inductor, an i th resonant capacitor, and an excitation inductor of an i th transformer form an i th LLC resonant network, and the i th LLC resonant network is connected to an i th-phase three-level DC/DC circuit, so that the ZVS and ZCS of a power switch can work in the i th-phase three-level DC/DC circuit. In addition, because a first inductor is connected to an input power supply and N rectifier circuits; or the first inductor is connected to the input power supply and a voltage dividing unit of N-phase three-level DC/DC circuits, the ripple of an output filtering capacitor or the ripple of an input filtering capacitor can be reduced, implementing current equalization for each-phase staggered parallel three-level DC/DC converter and improving working reliability of a DC/DC converter.

Figure 3:
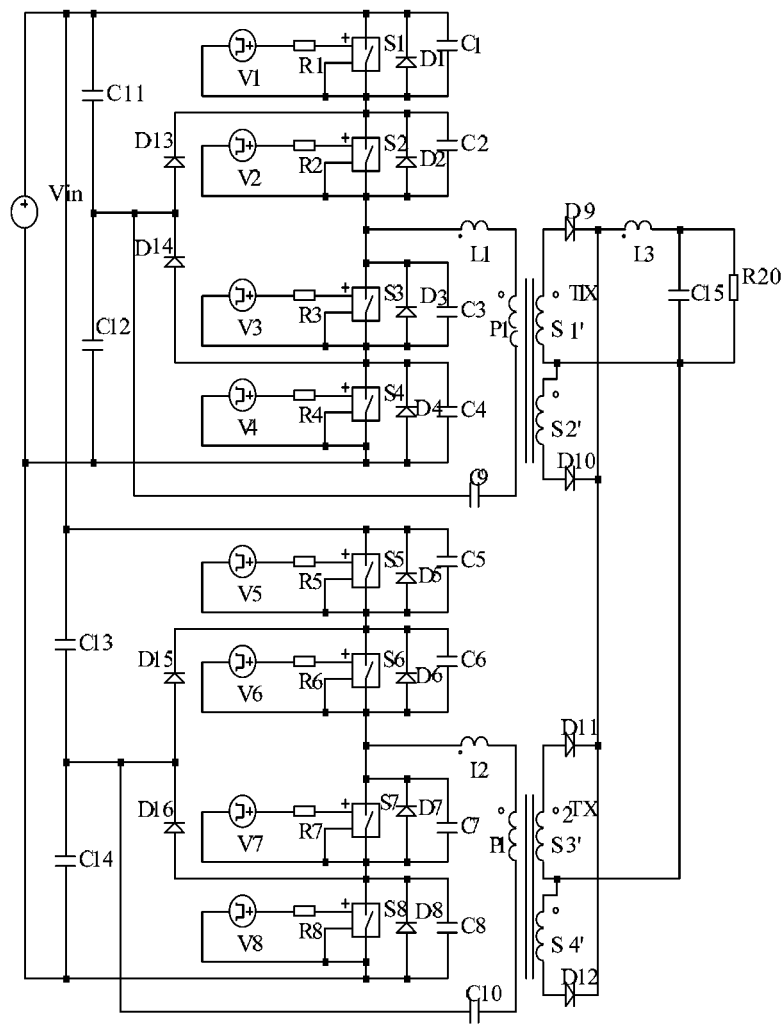
FIG. 3 is a circuit schematic diagram of a staggered parallel three-level DC/DC converter according to still another embodiment of the present application.

FIG. 3 is a circuit schematic diagram of a staggered parallel three-level DC/DC converter according to still another embodiment of the present application. In the embodiment, taking an example that N=2, the number of input power supplies is one, a power switch is MOSFET, and rectifier circuits are central tap full-wave rectifier circuits, a technical solution of the embodiment is described in detail. As shown in FIG. 3, a staggered parallel three-level DC/DC converter includes an input power supply Vin, 2-phase of three-level DC/DC circuits (i.e., a first-phase three-level DC/DC circuit and a second-phase three-level DC/DC circuit), two resonant inductors (i.e., a first resonant inductor L1 and a second resonant inductor L2), two resonant capacitors (i.e., a first resonant capacitor C1 and a second resonant capacitor C2), two transformers (i.e., a first transformer TX1 and a second transformer TX2), two rectifier circuits (i.e., a first rectifier circuit and a second rectifier circuit), a first inductor L3, and an output circuit.

A first-phase three-level DC/DC converter includes: the first-phase three-level DC/DC circuit, the first resonant inductor L1, the first resonant capacitor C1, the first transformer TX1, and the first rectifier circuit; a second-phase three-level DC/DC converter includes the second-phase three-level DC/DC circuit, the second resonant inductor L2, the second resonant capacitor C2, the second transformer TX2, and the second rectifier circuit.

For the first-phase three-level DC/DC converter, the first-phase three-level DC/DC circuit includes: a first power switch S1, a second power switch S2, a third power switch S3, a fourth power switch S4, a first body diode D1, a second body diode D2, a third body diode D3, a fourth body diode D4, a first junction capacitor C1, a second junction capacitor C2, a third junction capacitor C3, a fourth junction capacitor C4, a first drive power V1, a second drive power V2, a third drive power V3, a fourth drive power V4, a first resistor R1, a second resistor R2, a third resistor R3, a fourth resistor R4, a first diode D13, a second diode D14, a first capacitor C11 (equivalent to the first voltage dividing unit of the i th-phase three-level DC/DC circuit 12 in the embodiment shown in FIG. 2), and a second capacitor C12 (equivalent to the second voltage dividing unit of the i th-phase three-level DC/DC circuit 12 in the embodiment shown in FIG. 2).

In the embodiment shown, the first power switch S1, the first body diode D1, and the first junction capacitor C1 are connected in parallel and form the first inverter in the i th-phase three-level DC/DC circuit 12 in the embodiment shown in FIG. 2. The second power switch S2, the second body diode D2, and the second junction capacitor C2 are connected in parallel and form the second inverter in the i th-phase three-level DC/DC circuit 12 in the embodiment shown in FIG. 2. The third power switch S3, the third body diode D3, and the third junction capacitor C3 are connected in parallel and form the third inverter in the i th-phase three-level DC/DC circuit 12 in the embodiment shown in FIG. 2. The fourth power switch S4, the fourth body diode D4, and the fourth junction capacitor C4 are connected in parallel and form the fourth inverter in the i th-phase three-level DC/DC circuit 12 in the embodiment shown in FIG. 2.

The first drive power V1 and the first resistor R1 are connected in series and form the first drive unit in the i th-phase three-level DC/DC circuit 12 in the embodiment shown in FIG. 2; the second drive power V2 and the second resistor R2 are connected in series and form the second drive unit in the i th-phase three-level DC/DC circuit 12 in the embodiment shown in FIG. 2; the third drive power V3 and the third resistor R3 are connected in series and form the third drive unit in the i th-phase three-level DC/DC circuit 12 in the embodiment shown in FIG. 2; the fourth drive power V4 and the fourth resistor R4 are connected in series and form the fourth drive unit in the i th-phase three-level DC/DC circuit 12 in the embodiment shown in FIG. 2.

In the embodiment, the first capacitor C11 and the second capacitor C12 are connected in series; the first diode D13 and the second diode D14 are connected in series; the positive end of the first power switch S1 is connected to one end of the first capacitor C11, and the negative end of the first power switch S1 is connected to the cathode of the first diode D13; the positive end of the second power switch S2 is connected to the cathode of the first diode D13, and the negative end of the second power switch S2 is connected to one end of the first resonant inductor L1; the positive end of the third power switch S3 is connected to one end of the first resonant inductor L1, the negative end of the third power switch S3 is connected to the anode of the second diode D14; the positive end of the fourth power switch S4 is connected to the anode of the second diode D14, and the negative end of the fourth power switch S4 is connected to one end of the second capacitor C12. The other end of the first resonant inductor L1 is connected to one end of an excitation inductor P1 of the first transformer TX1; one end of the first resonant capacitor C1 is connected to the other end of the excitation inductor P1 of the first transformer TX1, and the other end of the first resonant capacitor C1 is connected to the anode of the first diode D13, the cathode of the second diode D14, the other end of the first capacitor C11, and the other end of the second capacitor C12.

A first drive signal output by the first drive power V1 and a second drive signal output by the second drive power V2 are complementary; a third drive signal output by the third drive power V3 and a fourth drive signal output by the fourth drive power V4 are complementary. Time for turning off the first power switch S1 in the first drive signal is earlier than time for turning off the second power switch S2 in the second drive signal; time for turning off the fourth power switch S4 in the fourth drive signal is earlier than time for turning off the third power switch S3 in the third drive signal. With a deadtime not considered, duty cycle is fixed at 50% and switching frequencies of the four power switches are driven to control an output voltage. The first diode D13 and the second diode D14 have the function of clamping a voltage, to ensure that voltage stress when the first power switch S1 and the fourth power switch S4 are turned off is a half of an input voltage, and the second power switch S2 and the third power switch S3 which are turned off later withstand the other half of the input voltage.

In addition, the first rectifier circuit includes: a third diode D9 and a fourth diode D10. The output circuit includes: a third capacitor C15, a fifth resistor R9, and the third capacitor C15 and the fifth resistor R9 are connected in parallel, where the anode of the third diode D9 is connected to one end of a first auxiliary coil S1' of the first transformer TX1, and the cathode of the third diode D9 is connected to one end of the first inductor L3; the anode of the fourth diode D10 is connected to one end of a second auxiliary coil S2' of the first transformer TX1, and the cathode of the fourth diode D10 is connected to one end of the first inductor L3; the other end of the first inductor L3 is connected to one end of the third capacitor C15, and the other end of the third capacitor C15 is connected to the other end of the first auxiliary coil S1' and the other end of the second auxiliary coil S2'.

For the second-phase three-level DC/DC converter, the second-phase three-level DC/DC circuit includes: a first power switch S5, a second power switch S6, a third power switch S7, a fourth power switch S8, a first body diode D5, a second body diode D6, a third body diode D7, a fourth body diode D8, a first junction capacitor C5, a second junction capacitor C6, a third junction capacitor C7, a fourth junction capacitor C8, a first drive power V5, a second drive power V6, a third drive power V7, a fourth drive power V8, a first resistor R5, a second resistor R6, a third resistor R7, a fourth resistor R8, a first diode D15, a second diode D16, a first capacitor C13 (equivalent to the first voltage dividing unit of the i th-phase three-level DC/DC circuit 12 in the embodiment shown in FIG. 2), and a second capacitor C14 (equivalent to the second voltage dividing unit of the i th-phase three-level DC/DC circuit 12 in the embodiment shown in FIG. 2).

In addition, the second rectifier circuit includes: a third diode D11 and a fourth diode D12.

The power topology structure of the second-phase three-level DC/DC converter is substantially the same as the power topology structure of the first-phase three-level DC/DC converter, and is not detailed herein again. The difference lies in that a drive signal of the first-phase three-level DC/DC circuit and a drive signal of the second-phase three-level DC/DC circuit are staggered by M=360/2N=360/2*2=90 degrees.

In the embodiment, the steady-state analysis on the circuit schematic diagram of the staggered parallel three-level DC/DC converter shown in FIG. 3 is provided, where the third capacitor C15 is considered to be infinitely great and may be considered as a voltage source. The capacity of the first capacitor C11 and the capacity of the second capacitor C12 of the first-phase three-level DC/DC circuit are also infinitely great and may be considered as two voltage sources. The capacity of the first capacitor C13 and the capacity of the second capacitor C14 of the second-phase three-level DC/DC circuit are also infinitely great and may also be considered as two voltage sources. The current flowing through the first inductor L3 is continuous and may be considered as a current source.

Figure 4:
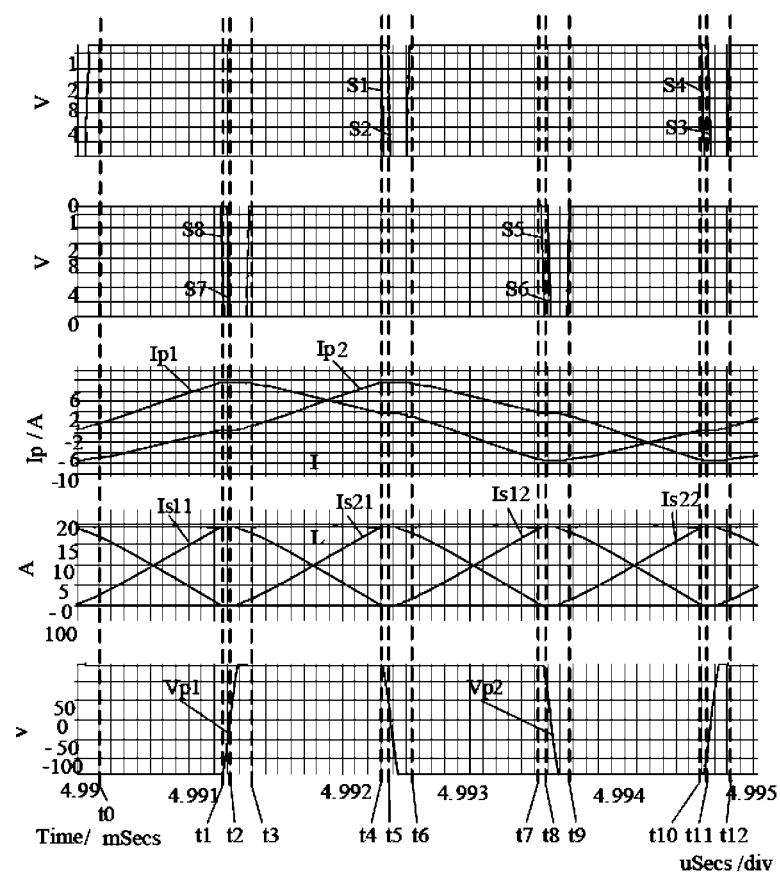
FIG. 4 is a working waveform of a staggered parallel three-level DC/DC converter.
Figure 5A:
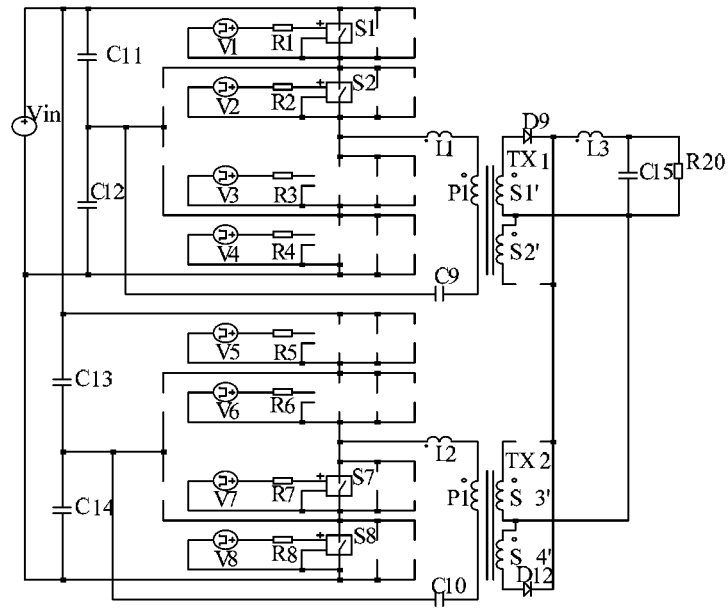
FIG. 5a is an equivalent circuit schematic diagram of mode 1.
Figure 5B:
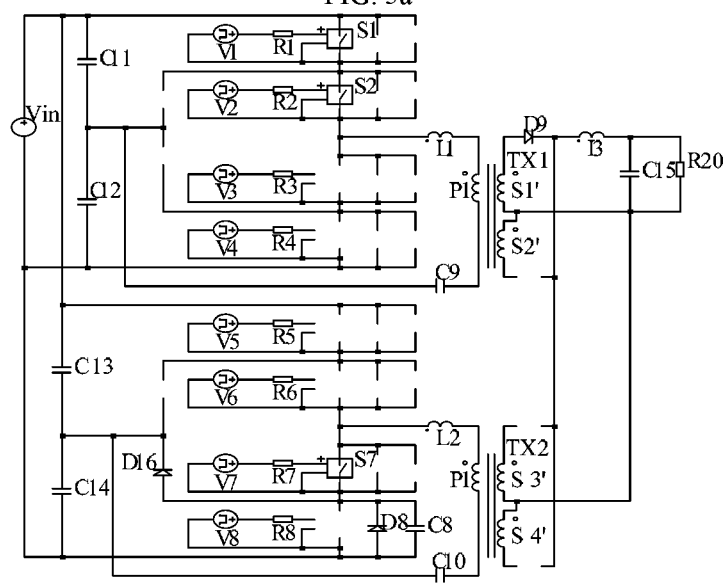
FIG. 5b is an equivalent circuit schematic diagram of mode 2.
Figure 5C:
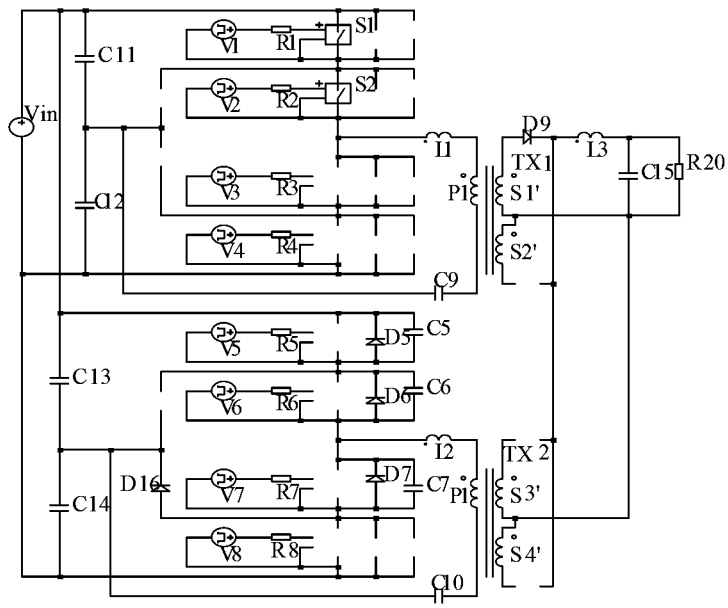
FIG. 5c is an equivalent circuit schematic diagram of mode 3.
Figure 5D:
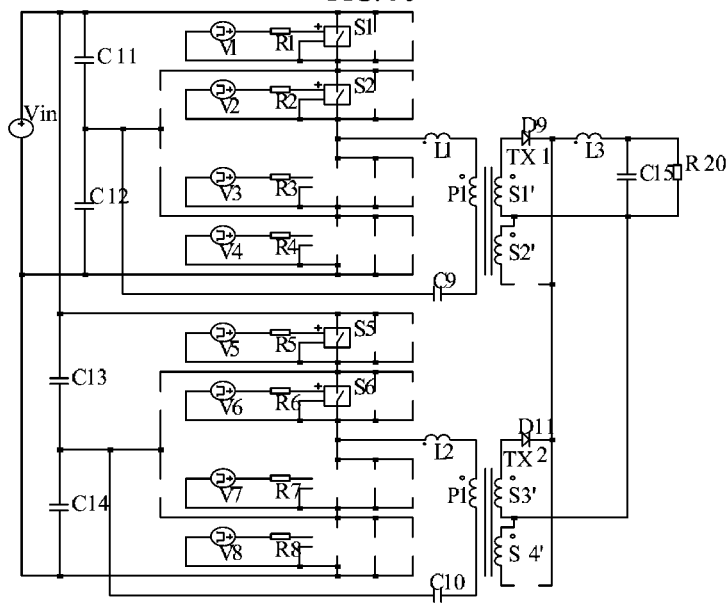
FIG. 5d is an equivalent circuit schematic diagram of mode 4.
Figure 5E:
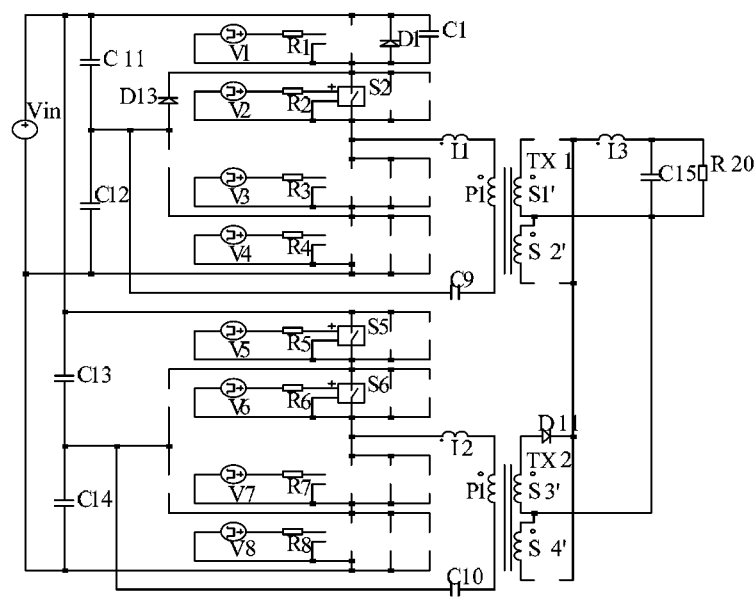
FIG. 5e is an equivalent circuit schematic diagram of mode 5.
Figure 5F:
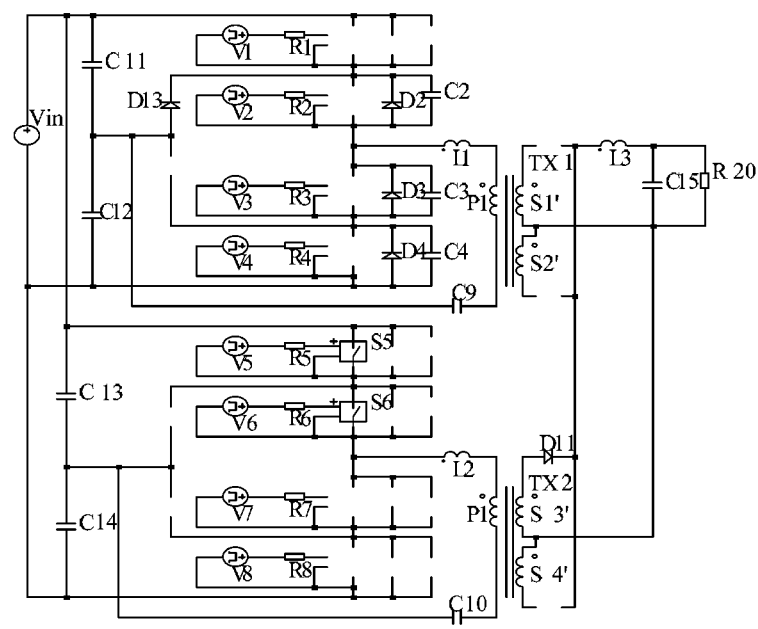
FIG. 5f is an equivalent circuit schematic diagram of mode 6.

In addition, a switching cycle of the staggered parallel three-level DC/DC converter may be divided into 12 modes. FIG. 4 is a working waveform of a staggered parallel three-level DC/DC converter. As shown in FIG. 4, a working waveform of a first half cycle and a working waveform of a second half cycle are symmetric, and working processes are similar. Therefore, in the embodiment, only a working process of a half cycle is analyzed, that is, six modes are analyzed. FIG. 5a is an equivalent circuit schematic diagram of mode 1; FIG. 5b is an equivalent circuit schematic diagram of mode 2; FIG. 5c is an equivalent circuit schematic diagram of mode 3; FIG. 5d is an equivalent circuit schematic diagram of mode 4; FIG. 5e is an equivalent circuit schematic diagram of mode 5; FIG. 5f is an equivalent circuit schematic diagram of mode 6; as shown in FIG. 5a to FIG. 5f, six modes corresponding to six equivalent circuits are described as follows:

in an initial state, a first power switch S1 and a second power switch S2 of the first-phase three-level DC/DC converter are turned on, and a third power switch S3 and a fourth power switch S4 are turned off; a first power switch S5 and a second power switch S6 of the second-phase three-level DC/DC converter are turned off, and a third power switch S7 and a fourth power switch S8 are turned on.

Mode 1 (t0-t1): The third power switch S7 and the fourth power switch S8 are still turned on, the first power switch S5 and the second power switch S6 are still turned off, and a second primary current Ip2 in the second-phase three-level DC/DC converter keeps flowing through the third power switch S7 and the fourth power switch S8 and still changes in a sine form. The third diode D11 is still turned off, the fourth diode D12 is still turned on, a current Is22 flows through a second secondary side, and a secondary voltage of the second transformer TX2 is clamped to Vin/2, so resonance of the second-phase three-level DC/DC converter is generated by the second resonant inductor L2 and the second resonant capacitor C10; at the same time, an excitation current Im2 flowing through the second transformer TX2 starts to decrease linearly. The second secondary current Is22 is obtained after the difference between the second primary resonant current Ip2 and the excitation current Im2 is converted according to a transformer ratio of the second transformer TX2. In another aspect, the first power switch S1 and the second power switch S2 are turned on simultaneously, the third power switch S3 and the fourth power switch S4 are still turned off, and a first primary current Ip1 flows through the first power switch S1 and the second power switch S2 and changes in a sine form. The third diode D9 starts to turn on the ZCS, the fourth diode D10 is still turned off, a current Is11 flows through a first secondary side, and a secondary voltage of the first transformer TX1 is clamped to Vin/2. Therefore, resonance of the first-phase three-level DC/DC converter is generated by the first resonant inductor L1 and the first resonant capacitor C9; at the same time, an excitation current Im1 flowing through the first transformer TX1 starts to increase linearly. The first secondary current Is11 is obtained after the difference between the first primary current Ip1 and the excitation current 1 ml is converted according to a transformer ratio of the first transformer TX1. Because a sum of the first secondary current Is11 and the second secondary current Is22 is equal to a current IL flowing through the first inductor L3, after being converted to a primary side, a sum of the first primary current Ip1 and the second primary current Ip2 is also equal to a fixed value.

Mode 2 (t1-t2): The fourth power switch S8 starts to be turned off, the third power switch S7 is still turned on, the first power switch S5 and the second power switch S6 are still turned off, the second primary current Ip2 charges a fourth junction capacitor C8 of the fourth power switch S8, and at this time, a current flowing through the third power switch S7 and the fourth power switch S8 is only an excitation current of the second transformer TX2, so the fourth power switch S8 can implement ZVS turning-off and ZCS turning-off. Subsequently, the third power switch S7 and the second diode D16 start freewheeling and the voltage of the fourth power switch S8 at the moment of turning off the fourth power switch S8 is clamped to Vin/2. The third diode D11 is still turned off, the fourth diode D12 starts to turn off the ZCS, and a primary side of the second transformer TX2 is equivalent to an open circuit, so resonance of the second-phase three-level DC/DC converter is generated by the second resonant inductor L2, an excitation inductor P2 of the second transformer TX2, and the second resonant capacitor C10, and at the same time, the excitation current Im2 flowing through the second transformer TX2 stays at a negative peak value. In another aspect, the first power switch 51 and the second power switch S2 are still turned on, the third power switch S3 and the fourth power switch S4 are still turned off. Because a sum of the first secondary current Is11 and the second secondary current Is22 is equal to a current IL flowing through the first inductor L3, after being converted to a primary side, a sum of the first primary current Ip1 and the second primary current Ip2 is also equal to a fixed value. Therefore, the first secondary current Is11 is still the secondary inductor current IL, and the first primary current Ip1 is still its mapping value, equivalent to that the primary side of the first transformer TX1 is clamped by a current source. The third diode D9 is still turned on, the current Is11 flows through the first secondary side, and first primary resonance is generated by the first resonant inductor L1 and the first resonant capacitor C9; while the second secondary current Is22 is zero, and the second primary current Ip2 is still the negative peak value of the excitation current of the second transformer TX2.

Mode 3 (t2-t3): The fourth power switch S8 is still turned off, the third power switch S7 starts to be turned off, the first power switch S5 and the second power switch S6 are still turned off, the second primary current Ip2 charges a third junction capacitor C7 of the third power switch S7 and discharges a first junction capacitor C5 of the first power switch S5 and a second junction capacitor C6 of the second power switch S6, and at this time, a current flowing through the third power switch S7 is only an excitation current of the second transformer TX2, so the third power switch S7 can implement ZVS turning-off and ZCS turning-off. Subsequently, the first body diode D5 of the first power switch S5 and the second body diode D6 of the second power switch S6 start freewheeling, the voltage of the third power switch S7 at the moment of turning off the third power switch S7 is clamped to the other half Vin/2, and at this time, a current flowing through the first body diode D5 of the first power switch S5 and the second body diode D6 of the second power switch S6 is only an excitation current of the second transformer TX2. If the first power switch S5 and the second power switch S6 are turned on at this time, ZVS turning-on and ZCS turning-on may be implemented. The third diode D11 and the fourth diode D12 are still turned off, and a primary side of the second transformer TX2 is equivalent to an open circuit, so resonance of the second-phase three-level DC/DC converter is still generated by the second resonant inductor L2, the excitation current P2 of the second transformer TX2, and the second resonant capacitor C10, and at the same time, the excitation current Im2 flowing through the second transformer TX2 still stays at a negative peak value. In another aspect, the first power switch S1 and the second power switch S2 are still turned on, and the third power switch S3 and the fourth power switch S4 are still turned off. The first secondary current Is11 is still the secondary inductor current IL, and the first primary current Ip1 is still its mapping value, equivalent to that the secondary side of the first transformer TX1 is clamped by a current source. The third diode D9 is still turned on, the first secondary current Is11 flows through the secondary side, and primary resonance is generated by the first resonant inductor L1 and the first resonant capacitor C9; while the second secondary current Is22 is zero, and the second primary current Ip2 is still the negative peak value of an excitation current of the second transformer TX2.

Mode 4 (t3-t4): The third power switch S7 and the fourth power switch S8 are still turned off, the first power switch S5 and the second power switch S6 are turned on simultaneously, and the second primary current Ip2 flows through the first power switch S5 and the second power switch S6 and changes in a sine form. The third diode D11 starts ZCS turning-on, the fourth diode D12 is still turned off, the second secondary current Is21 flows through the secondary side, and the secondary voltage of the second transformer TX2 is clamped to Vin/2. Therefore, resonance of the second-phase three-level DC/DC converter is generated by the second resonant inductor L2 and the second resonant capacitor C10; at the same time, an excitation current Im2 flowing through the second transformer TX2 starts to increase linearly. The first secondary current Is21 is obtained after the difference between the second primary current Ip2 and the excitation current Im2 is converted according to a transformer ratio of the second transformer TX2. In another aspect, the first power switch S1 and the second power switch S2 are still turned on, the third power switch S3 and the fourth power switch S4 are still turned off, and the first primary current Ip1 flows through the first power switch S1 and the second power switch S2 and changes in a sine form. The third diode D9 is still turned on, the fourth diode D10 is still turned off, the first secondary current Is11 flows through the secondary side, and the secondary voltage of the first transformer TX1 is clamped to Vin/N. Therefore, resonance of the first-phase three-level DC/DC converter is generated by the first resonant inductor L1 and the first resonant capacitor C9; at the same time, the excitation current Im1 flowing through the first transformer TX1 starts to decrease linearly. The first secondary current Is11 is obtained after the difference between the first primary current Ip1 and the excitation current Im1 is converted according to a transformer ratio of the first transformer TX1.

Because a sum of the first secondary current Is11 and the second secondary current Is21 is equal to a current IL flowing through the first inductor L3, after being converted to the primary side, a sum of the first primary current Ip1 and the second primary current Ip2 is still equal to a fixed value.

Mode 5 (t4-t5): The first power switch S1 starts to be turned off, the second power switch S2 is still turned on, the third power switch S3 and the fourth power switch S4 are still turned off, the first primary current Ip1 charges a first junction capacitor C1 of the first power switch S1, and at this time, a current flowing through the first power switch S1 and the second power switch S2 is only an excitation current of the first transformer TX1, so the first power switch S1 can implement ZVS turning-off and ZCS turning-off. Subsequently, the second power switch S2 and the first diode D13 start freewheeling and the voltage of the first power switch S1 at the moment of turning off the first power switch S1 is clamped to Vin/2. The third diode D9 starts ZCS turning-off, the fourth diode D10 is still turned off, and the primary side of the first transformer TX1 is equivalent to an open circuit, so resonance of the first-phase three-level DC/DC converter is generated by the first resonant inductor L1, the excitation current P1 of the first transformer TX1, and the first resonant capacitor C9, and at the same time, the excitation current Im1 flowing through the first transformer TX1 stays at a positive peak value. In another aspect, the first power switch S5 and the second power switch S6 are still turned on, the third power switch S7 and the fourth power switch S8 are still turned off. Because a sum of the first secondary current Is11 and the second secondary current Is21 is equal to a current IL flowing through the first inductor L3, after being converted to a primary side, a sum of the first primary current Ip1 and the second primary current Ip2 is still equal to a fixed value. Therefore, the first secondary current Is21 is still the secondary inductor current IL, and the second primary current Ip2 is still its mapping value, equivalent to that the secondary side of the second transformer TX2 is clamped by a current source. The third diode D11 is still turned on, the second secondary current Is21 flows through the secondary side, and primary resonance is generated by the second resonant inductor L2 and the second resonant capacitor C10; while the first secondary current Is11 is zero, and the first primary current Ip1 is still the negative peak value of the excitation current of the first transformer TX1.

Mode 6 (t5-t6): The first power switch S1 is still turned off, the second power switch S2 starts to be turned off, the third power switch S3 and the fourth power switch S4 are still turned off, the first primary current Ip1 charges a second junction capacitor C2 of the second power switch S2 and discharges a third junction capacitor C3 of the third power switch S3 and a fourth junction capacitor C4 of the fourth power switch S4, and at this time, a current flowing through the second power switch S2 is only the excitation current of the first transformer TX1, so the second power switch S2 can implement ZVS turning-off and ZCS turning-off. Subsequently, the third body diode D3 of the third power switch S3 and the fourth body diode D4 of the fourth power switch S4 start freewheeling, the voltage of the second power switch S2 at the moment of turning off the second power switch S2 is clamped to the other half Vin/2, and at this time, a current flowing through the third body diode D3 of the third power switch S3 and the fourth body diode D4 of the fourth power switch S4 is only an excitation current of the first transformer TX1. If the third power switch S3 and the fourth power switch S4 are turned on at this time, ZVS turning-on and ZCS turning-on may be implemented. The third diode D9 and the fourth diode D10 are still turned off, and the primary side of the first transformer TX1 is equivalent to an open circuit, so resonance of the first-phase three-level DC/DC converter is generated by the first resonant inductor L1, the excitation current P1 of the first transformer TX1, and the first resonant capacitor C9, and at the same time, the excitation current Im1 flowing through the first transformer TX1 stays at a positive peak value. In another aspect, the first power switch S5 and the second power switch S6 are still turned on, and the third power switch S7 and the fourth power switch S8 are still turned off. The first secondary current Is21 is still the secondary inductor current IL, and the second primary current Ip2 is still its mapping value, equivalent to that the secondary side of the second transformer TX2 is clamped by a current source. The third diode D11 is still turned on, the second secondary current Is21 flows through the secondary side, and primary resonance is generated by the first resonant inductor L1 and the first resonant capacitor C9; while the first secondary current Is11 is zero, and the first primary current Ip1 is still the positive peak value of the excitation current of the first transformer TX1.

Through the steady-state analysis on the circuit schematic diagram of the staggered parallel three-level DC/DC converter shown in FIG. 3, the first power switch S1, the second power switch S2, the third power switch S3, the fourth power switch S4, the first power switch S5, the second power switch S6, the third power switch S7, and the fourth power switch S8 can implement ZVS turning-on and ZVS turning-off, and approximate ZCS turning-on and ZCS turning-off, and voltage stress of each power switch is a half of an input voltage; secondary rectifier diodes, that is, the third diode D9, the fourth diode D10, the third diode D11, and the fourth diode D12, can implement ZCS turning-on and ZCS turning-off, with almost no reverse recovery process; voltage stress at both ends is small, and is about twice of an output voltage.

In addition, a rise rate of a current on the primary side and the secondary side of the first-phase three-level DC/DC converter is equal to a fall rate of a current on the primary side and the secondary side of the second-phase three-level DC/DC converter. In deadtime, a primary current of the first-phase three-level DC/DC converter is clamped to an output inductor current, and at this time, a primary current of the second-phase three-level DC/DC converter is only an excitation current of a transformer. Therefore, a rise interval and a fall interval of the primary current are still in a sine resonance form, and a resonance frequency is determined by a resonant inductor and a resonant capacitor. In addition, in one aspect, because an excitation inductor of a transformer can implement zero voltage switching of ZVS for a primary power switch, and a current at the moment of turning off a power switch should be as small as possible, approximate ZCS zero current switching is implemented. In another aspect, a first inductor can reduce a ripple of an output filtering capacitor, implement current equalization for staggered parallel converters, and enable ZVS and ZCS of a power switch and ZCS of a secondary rectifier diode to work, so when compared with an existing DC/DC converter, a staggered parallel three-level DC/DC converter in the present application may achieve higher work efficiency.

Figure 6:
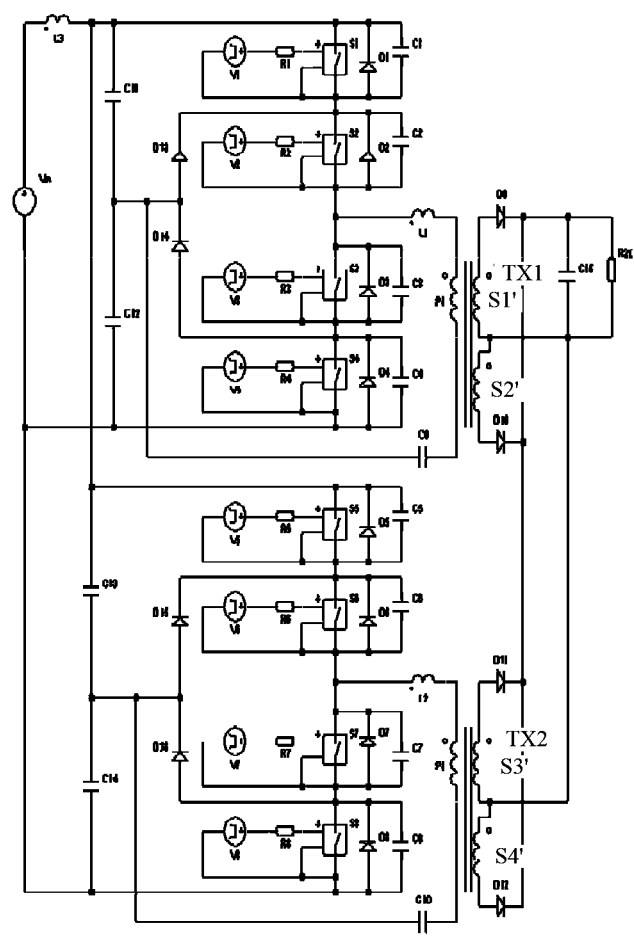
FIG. 6 is a circuit schematic diagram of a staggered parallel three-level DC/DC converter according to yet another embodiment of the present application.

FIG. 6 is a circuit schematic diagram of a staggered parallel three-level DC/DC converter according to yet another embodiment of the present application. The implementation manner of the staggered parallel three-level DC/DC converter in the embodiment shown in FIG. 6 and the implementation manner of the staggered parallel three-level DC/DC converter in the embodiment shown in FIG. 4 are the same; the only difference lies in that: one end of a first inductor L3 of the staggered parallel three-level DC/DC converter in the embodiment is connected to the positive end of an input power supply Vin, and the other end of the first inductor L3 is connected to one end of a first capacitor C11 and one end of a first capacitor C13. The cathode of a third diode D9 and the cathode of a fourth diode D10 are both connected to one end of a third capacitor C15; the cathode of a third diode D11 and the cathode of a fourth diode D12 are both connected to one end of the third capacitor C15.

Figure 7:
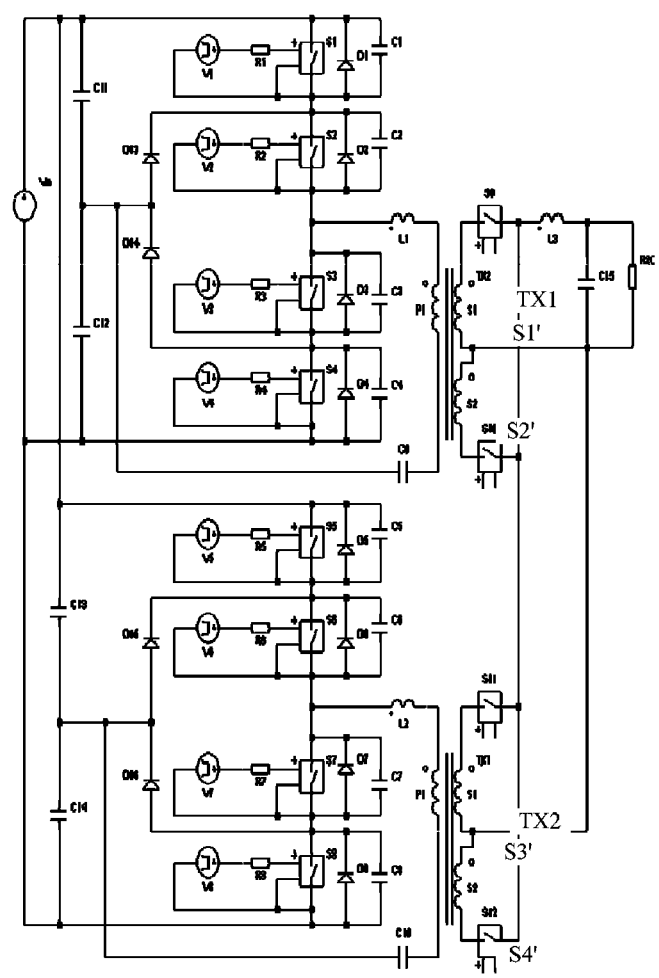
FIG. 7 is a circuit schematic diagram of a staggered parallel three-level DC/DC converter according to yet another embodiment of the present application.

FIG. 7 is a circuit schematic diagram of a staggered parallel three-level DC/DC converter according to yet another embodiment of the present application. The implementation manner of the staggered parallel three-level DC/DC converter in the embodiment shown in FIG. 7 and the staggered parallel three-level DC/DC converter in the embodiment shown in FIG. 4 are the same; the only difference lies in that: in the staggered parallel three-level DC/DC converter in the embodiment, a ninth power switch S9 replaces the third diode D9, a tenth power switch S10 replaces the fourth diode D10, an eleventh power switch S11 replaces the third diode D11, and a twelfth power switch S12 replaces the fourth diode D12.

A power switch, a body diode, a junction capacitor, a resonant inductor, a resonant capacitor, and a first inductor mentioned in each embodiment of the present application may be an independent device, or may be implemented by connecting a plurality of devices in series or in parallel, for example, a diode mentioned in the embodiment of the present application is implemented by connecting a plurality of diodes in series or in parallel.

Figure 8:
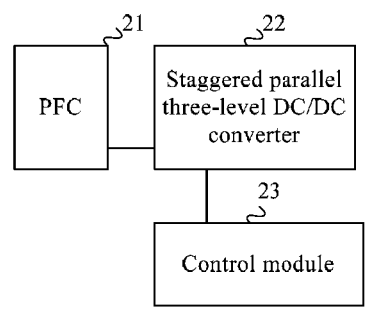
FIG. 8 is a schematic structural diagram of an AC/DC converter according to an embodiment of the present application.

FIG. 8 is a schematic structural diagram of an AC/DC converter according to an embodiment of the present application. As shown in FIG. 8, the AC/DC converter includes: a PFC 21 and a staggered parallel three-level DC/DC converter 22. The staggered parallel three-level DC/DC converter 22 may be the staggered parallel three-level DC/DC converter in any embodiment shown in FIG. 1 to FIG. 7.

Further, the AC/DC converter includes: a control module 23, configured to control drive units in each-phase three-level DC/DC circuit in the staggered parallel three-level DC/DC converter 22. For example, taking one-phase three-level DC/DC circuit which includes a first drive unit, a second drive unit, a third drive unit, and a fourth drive unit as an example, the control module 23 is configured to control that a first drive signal output by the first drive unit and a second drive signal output by the second drive unit are complementary, that a third drive signal output by the third drive unit and a fourth drive signal output by the fourth drive unit are complementary, that time for turning off a power switch in the first drive signal output by the first drive unit is earlier than time for turning off a power switch in the second drive signal output by the second drive unit, and that time for turning off a power switch in the fourth drive signal output by the fourth drive unit is earlier than time for turning off a power switch in the third drive signal output by the third drive unit.

The control module 23 may use an input feedback variable frequency control mode, a middle bus control mode or an input voltage feedforward control mode to control drive units in each-phase three-level DC/DC circuit in the staggered parallel three-level DC/DC converter 22.

In conclusion, a staggered parallel three-level DC/DC converter and an AC/DC converter provided in embodiments of the present application not only have major advantages of a three-level DC/DC converter, such as adaptive to an application scenario of a high input voltage, and major advantages of an LLC resonant DC/DC converter, such as enabling ZVC of a primary power switch and ZCS of a secondary rectifier diode to work, but also have the following advantages:

1) LLC resonance working, a primary current approaching a sine wave, to improve EMC performance. As can be seen from the foregoing analysis, a rise rate of a current on the primary side and the secondary side of one-phase three-level DC/DC converter is equal to a fall rate of a current on the primary side and the secondary side of another-phase converter. In deadtime, a primary current of the converter is clamped to an output inductor current, and at this time, a primary current of the another converter is only an excitation current of a transformer. Therefore, a rise interval and a fall interval of a primary current are still in a sine resonance form, and a resonance frequency is determined by a resonant inductor and a resonant capacitor.

2) enabling ZVS and ZCS of a primary power switch and ZCS of a rectifier diode to work. With proper design, an excitation inductor of a transformer can implement ZVS zero voltage switching for a primary power switch, so that a current at the moment of turning off the power switch may be as small as possible, approximate ZCS zero current switching can be implemented, and voltage stress of each switch is a half of an input voltage; a secondary rectifier diode can implement ZCS turning-on and ZCS turning-off, with almost no reverse recovery process; voltage stress at both ends of the diode is small, and is about twice of an output voltage.

3) an extra small output inductance value can reduce an output ripple of a filtering capacitor, implement current equalization for staggered parallel converters, and enable ZVS and ZCS of a power switch and ZCS of a secondary rectifier diode to work. Therefore, compared with a common DC/DC converter, the new type of a converter can achieve higher working efficiency. Staggered parallel working reduces input and output current ripples and improves the service life of an output electrolytic capacitor and system reliability.

4) a staggered parallel three-level DC/DC converter in an embodiment of the present application may be conveniently expanded to two-phase, three-phase, or multi-phase staggered parallel, greatly increasing output power of a DC/DC converter, and flexibly implementing high efficiency within a whole load range.

The expression of first, second, third, fourth, and fifth used in the description of the foregoing embodiments is not intended to limit a sequence, but is only for convenience of distinguishing.

Finally, the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A staggered parallel three-level DC/DC converter, comprising:
   at least one input power supply;

N-phase three-level DC/DC circuits, N resonant inductors, N resonant capacitors, N transformers, and N rectifier circuits;
a first inductor; and
an output circuit;
wherein one end of an i th resonant inductor is connected to an i th-phase three-level DC/DC circuit, and the other end of the i th resonant inductor is connected to an excitation inductor of an i th transformer;
wherein one end of an i th resonant capacitor is connected to the i th-phase three-level DC/DC circuit, and the other end of the i th resonant capacitor is connected to the excitation inductor of the i th transformer;
wherein one end of the first inductor is connected to one input end of the output circuit, the other end of the first inductor is connected to one output end of each of the N transformers via one of the corresponding N rectifier circuits that are respectively connected to the N transformers, and another output end of each of the N transformers is connected to another input end of the output circuit;
wherein N is an integer and is greater than or equal to 2;
wherein i is an integer and 1≤i≤N; and
wherein each i th-phase three-level DC/DC circuit comprises: a first voltage dividing unit, a second voltage dividing unit, a first diode, a second diode, a first inverter, a second inverter, a third inverter, and a fourth inverter, wherein:
the first voltage dividing unit and the second voltage dividing unit are connected in series;
the first diode and the second diode are connected in series;
the first inverter, the second inverter, the third inverter, and the fourth inverter are in series connected in sequence;
the positive end of the first inverter is connected to one end of the first voltage dividing unit, and the negative end of the first inverter is connected to the cathode of the first diode;
the positive end of the second inverter is connected to the cathode of the first diode, and the negative end of the second inverter is connected to one end of the i th resonant inductor;
the positive end of the third inverter is connected to one end of the i th resonant inductor, and the negative end of the third inverter is connected to the anode of the second diode; and
the positive end of the fourth inverter is connected to the anode of the second diode, and the negative end of the fourth inverter is connected to one end of the second voltage dividing unit.

2. The staggered parallel three-level DC/DC converter according to claim 1, wherein the i th-phase three-level DC/DC circuit further comprises:
a first drive unit, connected to the first inverter and configured to output a first drive signal to the first inverter;
a second drive unit, connected to the second inverter and configured to output a second drive signal to the second inverter;
a third drive unit, connected to the third inverter and configured to output a third drive signal to the third inverter; and
a fourth drive unit, connected to the fourth inverter and configured to output a fourth drive signal to the fourth inverter;

wherein, the first drive signal and the second drive signal are complementary, the third drive signal and the fourth drive signal are complementary, time for turning off a power switch in the first drive signal is earlier than time for turning off a power switch in the second drive signal, and time for turning off a power switch in the fourth drive signal is earlier than time for turning off a power switch in the third drive signal.

3. The staggered parallel three-level DC/DC converter according to claim 2, wherein a plurality of drive signals in each-phase three-level DC/DC circuit is staggered by M degrees from each other, and M=360/2N.

4. The staggered parallel three-level DC/DC converter according to claim 1, wherein: one end of the i th resonant inductor is connected to the i th-phase three-level DC/DC circuit, and the other end of the i th resonant inductor is connected to the excitation inductor of the i th transformer;
that one end of the i th resonant capacitor is connected to the i th-phase three-level DC/DC circuit and the other end of the i th resonant capacitor is connected to the excitation inductor of the i th transformer comprises:
one end of the i th resonant capacitor being connected to the other end of the excitation inductor of the i th transformer, and the other end of the i th resonant capacitor being connected to the anode of the first diode, the cathode of the second diode, the other end of the first voltage dividing unit, and the other end of the second voltage dividing unit.

5. The staggered parallel three-level DC/DC converter according to claim 1, wherein each converter comprises: a power switch, a body diode, and a junction capacitor, wherein the power switch, the body diode, and the junction capacitor are connected in parallel.

6. The staggered parallel three-level DC/DC converter according to claim 1, wherein the rectifier circuits are central tap full-wave rectifier circuits or bridge rectifier circuits.

7. The staggered parallel three-level DC/DC converter according to claim 6, wherein each of the rectifier circuits is formed by a rectifier diode or a power switch.

8. An AC/DC (alternating current/direct current) converter, comprising:
a power factor rectifier circuit; and
a staggered parallel three-level DC/DC (direct current/direct current) converter which comprises:
at least one input power supply, N-phase three-level DC/DC circuits, N resonant inductors, N resonant capacitors, N transformers, N rectifier circuits, a first inductor, and an output circuit;
wherein one end of an i th resonant inductor is connected to an i th-phase three-level DC/DC circuit, and the other end of the i th resonant inductor is connected to an excitation inductor of an i th transformer;
wherein one end of an i th resonant capacitor is connected to the i th-phase three-level DC/DC circuit, and the other end of the i th resonant capacitor is connected to the excitation inductor of the i th transformer;
wherein one end of the first inductor is connected to one input end of the output circuit, the other end of the first inductor is connected to one output end of each of the N transformers via one of the corresponding N rectifier circuits that are respectively connected to the N transformers, and another output end of each of the N transformers is connected to another input end of the output circuit;

wherein N is an integer and is greater than or equal to 2;

wherein i is an integer and 1≤i ≤N; and wherein each i th-phase three-level DC/DC circuit comprises: a first voltage dividing unit, a second voltage dividing unit, a first diode, a second diode, a first inverter, a second inverter, a third inverter, and a fourth inverter, wherein:

the first voltage dividing unit and the second voltage dividing unit are connected in series;

the first diode and the second diode are connected in series;

the first inverter, the second inverter, the third inverter, and the fourth inverter are in series connected in sequence;

the positive end of the first inverter is connected to one end of the first voltage dividing unit, and the negative end of the first inverter is connected to the cathode of the first diode;

the positive end of the second inverter is connected to the cathode of the first diode, and the negative end of the second inverter is connected to one end of the i th resonant inductor;

the positive end of the third inverter is connected to one end of the i th resonant inductor, and the negative end of the third inverter is connected to the anode of the second diode; and the positive end of the fourth inverter is connected to the anode of the second diode, and the negative end of the fourth inverter is connected to one end of the second voltage dividing unit.

9. The AC/DC converter according to claim 8, wherein the i th-phase three-level DC/DC circuit further comprises:

a first drive unit, connected to the first inverter and configured to output a first drive signal to the first inverter;

a second drive unit, connected to the second inverter and configured to output a second drive signal to the second inverter;

a third drive unit, connected to the third inverter and configured to output a third drive signal to the third inverter; and a fourth drive unit, connected to the fourth inverter and configured to output a fourth drive signal to the fourth inverter;

wherein, the first drive signal and the second drive signal are complementary; the third drive signal and the fourth drive signal are complementary; time for turning off a power switch in the first drive signal is earlier than time for turning off a power switch in the second drive signal; and, time for turning off a power switch in the fourth drive signal is earlier than time for turning off a power switch in the third drive signal.

10. The AC/DC converter according to claim 9, wherein a plurality of drive signals in each-phase three-level DC/DC circuit is staggered by M degrees from each other, and M=360/2N.

11. The AC/DC converter according to claim 8, wherein:

one end of the i th resonant inductor is connected to the i th-phase three-level DC/DC circuit, and the other end of the i th resonant inductor is connected to the excitation inductor of the i th transformer;

that one end of the i th resonant capacitor is connected to the i th-phase three-level DC/DC circuit and the other end of the i th resonant capacitor is connected to the excitation inductor of the i th transformer comprises:

tone end of the i th resonant capacitor being connected to the other end of the excitation inductor of the i th transformer, and the other end of the i th resonant capacitor being connected to the anode of the first diode, the cathode of the second diode, the other end of the first voltage dividing unit, and the other end of the second voltage dividing unit.

12. The AC/DC converter according to claim 8, wherein each converter comprises: a power switch, a body diode, and a junction capacitor, wherein the power switch, the body diode, and the junction capacitor are connected in parallel.

13. The AC/DC converter according to claim 8, wherein the rectifier circuits are central tap full-wave rectifier circuits or bridge rectifier circuits.

14. The AC/DC converter according to claim 13, wherein each of the rectifier circuits is formed by a rectifier diode or a power switch.

* * * * *